US 10,974,836 B2

(12) United States Patent
Harwood et al.

(10) Patent No.: US 10,974,836 B2
(45) Date of Patent: Apr. 13, 2021

(54) AIRCRAFT PROPULSION SYSTEM

(71) Applicant: ROLLS-ROYCE PLC, London (GB)

(72) Inventors: Richard Harwood, Derby (GB);
Kalyani G Menon, Derby (GB); Chloe Jo Palmer, Derby (GB); Ivan Popovic, Derby (GB)

(73) Assignee: ROLLS-ROYCE plc, London (GB)

(*) Notice: Subject to any disclaimer, the term of this patent is extended or adjusted under 35 U.S.C. 154(b) by 610 days.

(21) Appl. No.: 15/684,265

(22) Filed: Aug. 23, 2017

(65) Prior Publication Data

US 2018/0079515 A1 Mar. 22, 2018

(30) Foreign Application Priority Data

Sep. 19, 2016 (GB) .................................. 1615900

(51) Int. Cl.
*H02P 25/02* (2016.01)
*H02P 27/16* (2006.01)
(Continued)

(52) U.S. Cl.
CPC ............. *B64D 27/24* (2013.01); *B61C 5/00* (2013.01); *B63H 21/17* (2013.01); *B63H 21/20* (2013.01); *B64D 27/02* (2013.01); *H02J 3/005* (2013.01); *H02J 3/02* (2013.01); *H02J 3/46* (2013.01); *H02J 7/34* (2013.01); *H02P 5/74* (2013.01); *B64D 27/10* (2013.01); *B64D 2027/026* (2013.01); *Y02T 30/00* (2013.01); *Y02T 50/40* (2013.01); *Y02T 50/60* (2013.01);
(Continued)

(58) Field of Classification Search
CPC ...................................... F02C 6/16; F02G 5/00
See application file for complete search history.

(56) References Cited

U.S. PATENT DOCUMENTS 7,540,450 B2    6/2009    Brand et al.
7,939,962 B2    5/2011    Foch et al.
(Continued)

FOREIGN PATENT DOCUMENTS

EP        1029783 A2    8/2000
EP        1914162 A1    4/2008
(Continued)

OTHER PUBLICATIONS

Feb. 19, 2018 Search Report issued in European Patent Application No. 17187444.9.
(Continued)

*Primary Examiner* — Kawing Chan
*Assistant Examiner* — Charles S Laughlin
(74) *Attorney, Agent, or Firm* — Oliff PLC

(57) ABSTRACT

An aircraft propulsion system (10) comprises at least first and second electrical generators (15a, 15b), each being configured to provide electrical power to a respective first and second AC electrical network (16a, 16b). The system (10) further comprises at least first and second AC electrical motors (19a, 19b) directly electrically coupled to a respective AC network (16a, 16b) and coupled to a respective propulsor (4), and a DC electrical network electrically coupled to the first and second AC networks (16a, 16b) via respective first and second AC to DC converters (17a, 17b), and to a further electrical motor 19c, the further electrical motor (19c) being coupled to a propulsor (4).

15 Claims, 4 Drawing Sheets

(51) Int. Cl.

| | | |
|---|---|---|
| *B60L 50/13* | (2019.01) | |
| *B64D 27/24* | (2006.01) | |
| *B63H 21/20* | (2006.01) | |
| *H02P 5/74* | (2006.01) | |
| *B61C 5/00* | (2006.01) | |
| *B63H 21/17* | (2006.01) | |
| *B64D 27/02* | (2006.01) | |
| *H02J 3/46* | (2006.01) | |
| *H02J 3/00* | (2006.01) | |
| *H02J 7/34* | (2006.01) | |
| *H02J 3/02* | (2006.01) | |
| *B64D 27/10* | (2006.01) | |

(52) U.S. Cl.
CPC ............ *Y02T 70/50* (2013.01); *Y02T 70/5236* (2013.01); *Y02T 90/40* (2013.01)

(56) References Cited

U.S. PATENT DOCUMENTS

| | | | |
|---|---|---|---|
| 8,324,746 | B2 | 12/2012 | Bradbrook |
| 8,355,855 | B2 | 1/2013 | Minto et al. |
| 8,562,284 | B2 | 10/2013 | Bradbrook |
| 9,156,560 | B2 | 10/2015 | Burns et al. |
| 2011/0080040 | A1 | 4/2011 | Kumar |
| 2013/0169036 | A1 | 7/2013 | Todd et al. |
| 2014/0084677 | A1 | 3/2014 | Haillot |
| 2014/0290208 | A1 | 10/2014 | Rechain et al. |
| 2014/0333127 | A1* | 11/2014 | Edwards ................... H02J 4/00 307/9.1 |
| 2015/0151844 | A1 | 6/2015 | Anton et al. |
| 2015/0274306 | A1 | 10/2015 | Sheridan |
| 2015/0333527 | A1 | 11/2015 | Rideau et al. |
| 2015/0367950 | A1 | 12/2015 | Rajashekara et al. |
| 2016/0036220 | A1 | 2/2016 | Lacaux et al. |
| 2016/0380437 | A1* | 12/2016 | Casimir ................. H02M 7/217 307/9.1 |
| 2017/0184032 | A1* | 6/2017 | Poumarede ............... F02C 9/42 |
| 2017/0294782 | A1* | 10/2017 | Navarro .................... H02J 3/02 |

FOREIGN PATENT DOCUMENTS

| | | |
|---|---|---|
| EP | 2192681 A1 | 6/2010 |
| EP | 2801719 A1 | 11/2014 |
| EP | 2 878 538 A1 | 6/2015 |
| EP | 2995555 A1 | 3/2016 |
| WO | 2013/017680 A1 | 2/2013 |
| WO | 2013/079972 A1 | 6/2013 |
| WO | 2014/158240 A2 | 10/2014 |

OTHER PUBLICATIONS

Feb. 16, 2017 Search Report issued in British Patent Application No. 1615900.6.

Hyun Dae Kim et al. "Distributed Turboelectric Propulsion for Hybrid Wing Body Aircraft". Royal Aeronautical Society, 2008, pp. 1-11.

Clément Pornet. "Electric Drives for Propulsion System of Transport Aircraft". Intech, 2015, pp. 115-141.

Chad Campbell et al. "Design of a Hybrid Electrical Propulsion System". American Institute of Aeronautics and Astronautics, Inc., 2011, pp. 1-10.

* cited by examiner

AIRCRAFT PROPULSION SYSTEM

The present disclosure concerns an aircraft propulsion system, an aircraft comprising the propulsion system, and a method of operating the aircraft propulsion system.

There is a continuing need for more efficient aircraft designs, in terms of structural efficiency (i.e. minimising the overall weight of the aircraft structure), aerodynamic efficiency (i.e. minimising the aerodynamic drag incurred during flight) and fuel efficiency (i.e. minimising the fuel required to perform a particular aircraft mission). One solution for increasing aircraft efficiency is to provide an aircraft driven by a hybrid mechanical-electrical propulsion system.

In a hybrid mechanical-electrical propulsion system, a generator driven by, for example, an internal combustion engine, is employed to produce electrical power. This electrical power is provided to one or more propulsors, such as electric fans which may be distributed about the aircraft, remote from the electrical generator.

"Distributed Turboelectric Propulsion for Hybrid Wing Body Aircraft" by Hyun Dae Kim, Gerald V Brown and James L Felder, published by the Royal Aeronautical Society, describes a number of distributed propulsion systems and aircraft concepts. This document describes concepts in which a relatively large number of electrically driven propulsors are powered by a relatively small number of internal combustion engines.

Similarly, US2015/0367950 discloses a system in which a gas turbine engine drives an electrical generator. Power is distributed through an electrical network to a plurality of electrical motors, which drives propulsive fans.

Similar problems apply to other vehicle types, such as motor vehicles, marine vehicles etc.

Accordingly, the present disclosure seeks to provide a vehicle propulsion system which is efficient, lightweight, low cost and controllable.

According to a first aspect there is provided a vehicle propulsion system comprising:
at least first and second electrical generators, each being configured to provide AC electrical power to a respective first and second AC electrical network;
at least first and second AC electrical motors directly electrically coupled to a respective AC network and coupled to a respective propulsor; and
a DC electrical network electrically coupled to the first and second AC networks via respective first and second AC to DC converters, and to a further electrical motor, the further electrical motor being coupled to a propulsor.

Advantageously, the first and second directly electrically coupled motors efficiently provide propulsive thrust in view of the low losses provided by wholly AC electrical systems, while thrust control can be provided utilising the one or more electrical motors coupled to the DC electrical network, without requiring either power electronics or control of the frequency of the AC networks. Consequently, the invention provides an efficient yet controllable aircraft propulsion system.

One or more AC electrical generator may comprise a synchronous AC generator such as a permanent magnet or wound field synchronous generator or an asynchronous electrical generator such as an induction generator. One or more AC electrical motor may comprise one or more of a synchronous AC motor such as a permanent magnet or wound field synchronous motor or an asynchronous electrical motor such as an induction motor.

The first and/or second AC to DC converters may comprise bi-directional AC to DC converters configured to provide AC electrical power from the AC network to DC electrical power to the DC network, and DC electrical power from the DC network to AC electrical power to the AC electrical network.

Advantageously, in the event that one of the synchronous AC electric motors coupled to the AC electrical network loses synchronisation with the AC electrical network, the motor can be re-synchronised. This can be achieved without requiring a dedicated inverter for each electric motor, thereby saving weight and reducing electrical losses in normal operation.

The further electrical motor may comprise one or more of a DC electrical motor directly electrically coupled to the DC electrical network, and an AC electrical motor coupled to the DC electrical network via a DC to AC inverter.

A plurality of further AC electrical motors coupled to the DC electrical network may be provided. The inverter may be electrically coupled to the plurality of AC electrical motors, or a separate inverter may be provided for each electrical motor coupled to the DC electrical network.

The system may comprise a controller configured to control the first and second bi-directional AC-DC converters between:
a first operating mode, in which both the first and second AC-DC converters convert AC power from the respective AC networks to DC power to power to the DC network;
a second operating mode, in which the first AC-DC converter converts AC power from the first AC network to DC power to power the DC network, and the second AC-DC converter converts DC power from the DC network to AC power to power the second AC electrical network; and
a third operating mode, in which the second AC-DC converter converts AC power from the second AC network to DC power to power the DC network, and the first AC-DC converter converts DC power from the DC network to AC power to power the first AC electrical network.

Advantageously, the controller can re-route power in the event of failure of an electrical component.

The controller may be configured to switch from the first operating mode to the second or third operating mode in the event of one or more of:
the synchronous electrical motor directly coupled to the first or second electrical network becoming de-synchronised from the respective AC network; and
a failure of the first or second electrical generator.

The first and second generators may be driven by an internal combustion engine such as a gas turbine engine. Each electrical generator may be driven by a separate internal combustion engine, or may be driven by the same internal combustion engine, and may be driven by a separate independently rotatable shaft of the same gas turbine engine.

The system may comprise an energy storage device such as one or more of a battery, a capacitor and a hydrogen fuel cell electrically coupled to the DC electrical network, the energy storage device being configured to provide electrical power to the DC network in a discharging mode, and to receive electrical power from the DC network in a charging mode.

The system may comprise a further bi-directional AC-DC converter electrically coupled to at least one of the first and second AC networks and the energy storage device, and configured to provide electrical power from the energy storage device to the or each AC network in a discharging mode, and to receive electrical power from the DC network in a charging mode.

According to a second aspect there is provided an aircraft comprising the electrical network of the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
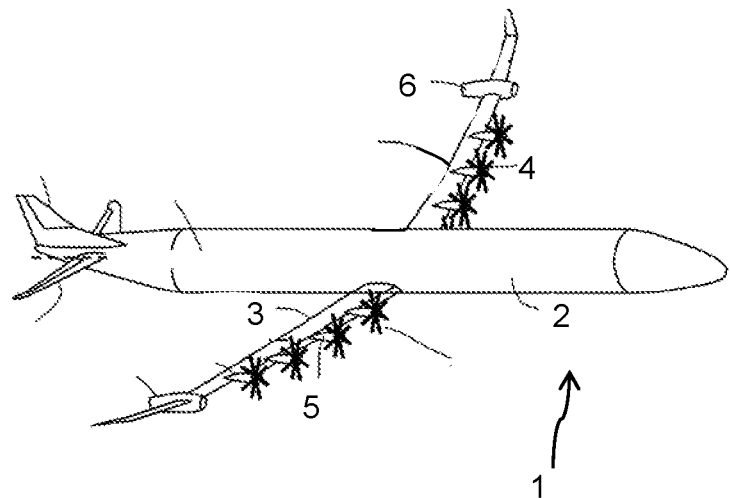
FIG. 1 is a plan view of an aircraft in accordance with the present disclosure.

With reference to FIG. 1, an aircraft 1 is described, comprising a propulsion system 10. The aircraft 1 comprises a fuselage 2, wings 3 and vertical 7 and horizontal 8 control surfaces. The aircraft 1 is powered by propulsors in the form of propellers 4 provided on wing mounted pods 5. In this embodiment, the engines 4 are mounted such that propellers 5 are located forward of the wing 2 and either side of the fuselage 2.

The aircraft comprises at least one gas turbine engine 6, with the described embodiment having a gas turbine engine 6 mounted on each wing 2, toward a respective tip.

Figure 2:
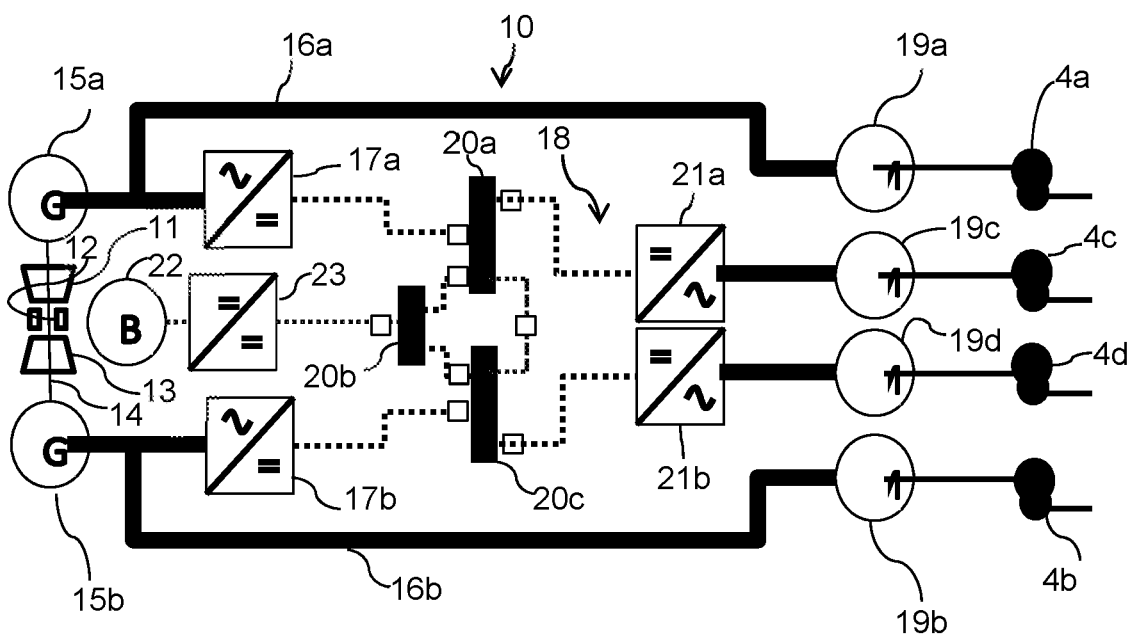
FIG. 2 is a schematic of a propulsion system for the aircraft of FIG. 1.

Referring to FIG. 2, part of the propulsion system 10 is shown schematically. The part of the propulsion system 10 shown in FIG. 2 represents the propulsion system for the propellers 4 of one of the wings 3, with a corresponding further part of the propulsion system provided on the other wing 3. Each gas turbine engine 6 comprises a compressor 11, combustor 12 and turbine 13. The compressor 11 and turbine 13 are interconnected by a shaft 14, such that rotation of the turbine in use causes rotation of the compressor 11.

The shaft 13 of each gas turbine engine 6 is also coupled to a respective rotor (not shown) of first and second synchronous alternating current (AC) electrical generators 15a, 15b. It will be understood that the term "synchronous electrical generator" relates to an AC generator in which, at steady state, the rotation of the rotor shaft is synchronised with the frequency of the output current. Examples include non-excited motors such as reluctance motors, hysteresis generators and permanent magnet generators, and DC excited generators, such as brushless DC excited and slip ring excited generators. Consequently, rotation of the shaft 14 causes rotation of each of the compressor 11, turbine 13 and the rotors of both generators 15a, 15, which thereby generate AC electrical power having a frequency proportional to the rotational speed of the shaft 14. It will be understood that the frequency will also be dependent on the number of poles of the stators (not shown) of the respective electrical generators 15a, 15b.

Each generator 15a, 15b is electrically coupled to an electrical network comprising respective first and second AC networks 16a, 16b. For convenience, AC connections are shown as thick solid lines, while DC connections are shown as dotted lines in FIGS. 2 to 4. Consequently, each electrical network 16a, 16b carries AC current having the frequency generated by the respective AC generator 15a, 15b. It will be understood that the first and second AC networks 16a, 16b do not necessarily carry electrical current having the same frequency. For example, the first and second generators 15a, 15b could have different pole numbers. Alternatively or in addition, the gas turbine engine 6 could comprise multiple shafts interconnecting different compressors and turbines, and the generators 15a, 15b could be driven by different gas turbine engine shafts, and so be rotated at different speeds. As a further possibility, the first and second generators 15a, 15b could be coupled to separate gas turbine engines 6, which could be operated at different speeds.

The AC networks 16a, 16b further comprise respective first and second directly coupled synchronous AC electrical motors 19a, 19b. Again, it will be understood that the term "synchronous electrical motor" relates to an AC motor in which, at steady state, the rotation of the rotor shaft is synchronised with the frequency of the supply current. In this case, the frequency of the supply current of the directly coupled motors 19a, 19b is the frequency of the current on the respective AC network 16a, 16b, which is the frequency of the output current of the respective generator 15a, 15b. It will be understood that, in a real system having inductance, perfect synchronicity of the generators 15a, 15b, networks 16a, 16b and motors 19a, 19b will rarely be achieved.

Each directly coupled electric motor 19a, 19b is coupled to a respective propeller 4a, 4b. Optionally, the electric motors 19a, 19b may be directly coupled to the respective propellers 4a, 4b, or may be coupled via a reduction gearbox. Consequently, in use, mechanical power from the gas turbine engine shaft 14 is used to generate AC electrical power by the generators 15a, 15b. This is then provided to the electrical motors 19a, 19b via the AC networks 16a, 16b, and converted back to mechanical power, which drives the propellers 4a, 4b.

The electrical network further comprises first and second bi-directional AC/DC converters 17a, 17b, which are electrically coupled at an AC side thereof to respective first and second AC electrical networks 16a, 16b. Each converter 17a, 17b is also coupled at a DC side thereof to a DC electrical network 18.

Each converter 17a, 17b is in the form of a power electronics unit configured to operate in an AC to DC conversion mode, and a DC to AC conversion mode. In the AC to DC conversion mode, power from the respective AC network 16a, 16b is converted to DC electrical power, and provided to the DC electrical network 18, whilst also managing ripple frequency. In the DC to AC conversion mode, power from the DC network 18 is converted to AC electrical power, and provided to the respective AC electrical network 16a, 16b. Consequently, when the converters 17a, 17b are operated in the AC to DC mode, power from the generators 15a, 15b is provided to both the AC networks 16a, 16b and the DC network 18.

The DC network 18 further comprises an energy storage device in the form of a battery 22, which is coupled to the DC network via a DC-DC converter 23 configured to operate in a discharging mode, in which the battery discharges power provided to the DC network 18, and a charging mode, in which the battery is charged with power from the DC network 18. The DC-DC converter ensures that power from the battery 22 is provided to the DC network at the correct voltage, and controls the voltage to the battery to control charging.

The DC electrical network 18 comprises first, second and third DC buses 20a, 20b, 20c. The first bus 20a is connected to the first converter 17a, the second bus 20b, the third bus 20c, and a first inverter 21a by respective connectors. The second bus 20b is connected to the battery 22 via the DC-DC converter 23, and to the third bus 20c. The third bus is connected to the second converter 17b, and to a second inverter 21b. Switches are provided, for selectively making and breaking contacts between the components 17a, 17b, 23, 20a-c, 21a, 21b.

Each inverter 21a, 21b is generally a one-way DC to AC converter operable as a motor controller, and is configured to receive power from a respective DC bus 21, 21c, and provide AC current at a required frequency to a respective indirectly-coupled motor 19c, 19d via an AC connector.

The motors 19c, 19d may be AC synchronous motors, similar to those of 19a, 19b. However, in view of the presence of the inverters 21a, 2b, the frequency of the supply current to each motors 19c, 19d can be controllable, and so the indirectly coupled motors are operable to rotate at a speed that is not dependent on the supply frequency from the AC generators 15a, 15b. Consequently, the rotational speed of the indirectly coupled motors 19c, 19d is fully controllable. Each indirectly coupled motors 19c, 19d is coupled to a respective propeller 4c, 4d, in a similar manner to the motors 19a, 19b.

The propulsion system 10 can be operated in one of three distinct operating modes. In a first mode, both generators 15a, 15b are operative, and the converters 17a, 17b are operated in the AC to DC mode. The battery 22 and DC-DC converter 23 may be in either a charging or discharging mode, depending on the state of charge of the battery, and electrical power requirements of the motors 19a-d. At least the switches interconnecting the converter 17a and inverter 21a, and the converter 17b and inverter 21b are closed. Consequently, AC electrical power at the generator frequency is provided to the directly coupled motors 19a, 19b. AC electrical power is also provided to the converters 17a, 17b, which convert this power to DC power. The DC power is provided to the DC network 18, and is sent to the inverters 21a, 21b where it is converted back to AC current, which may be of a different frequency than the AC current provided by the generators 15a, 15b.

Thrust control can be provided in the first mode as follows. Where increased thrust is required, the motors 19c, 19d are operated at a higher load. This can be achieved either by commanding the motor controllers 21a, 21b to provide output current at a higher frequency, or by increasing the torque requirement of the propeller, such as by increasing the propeller pitch. Consequently, an increased electrical load will be provided, which will increase the torque on the generators 15a, 15b and tend to reduce their rotational speed. This will therefore reduce the rotational speed of the gas turbine engine shaft 14, and so the rotational speed of both the compressor 11 and turbine 13. An engine controller (not shown) may detect this reduced rotational speed, and increase fuel flow to the combustor 12, to thereby maintain rotational speed of the engine at the nominal level. A reduction in thrust can be provided by reducing the load on the propellers 4c, 4d. Meanwhile, in either case, the motors 19a, 19b will continue to operate at their synchronous speed.

In accordance with the above, thrust control can be provided more rapidly than could be provided by ramping up and down the gas turbine rotational speed alone. Furthermore, since the gas turbine engine is operated at a constant rotational speed during most operation, the compressors and turbines can be designed for a single operating point, thereby increasing efficiency. On the other hand, where very low thrust is required, the gas turbine engine 6 can be throttled down to a lower rotational speed, to thereby reduce the rotational speed of the directly coupled propellers 4a, 4b. Furthermore, individual indirectly controlled propellers 4c, 4d can be operated at different speeds. In view of their different positions on the aircraft wing, yaw control can be provided, which can reduce the size or moment of required of the vertical control surface.

In a second operating mode of the propulsion system, the system 10 can be operated as follows. The first converter 17a is operated in the AC to DC conversion mode, while the second converter 17b is operated in the DC to AC converter mode. Consequently, power from the first AC network 16a is re-routed through the DC network 18, to the second AC network 16b. Power transfer may be supplemented from the battery 22. Meanwhile, power may continue to be transferred to the in-directly coupled motors 19c, 19d. Alternatively, the load from these motors may be reduced, in order for further power to be transferred to the second AC network 16b.

Consequently, in the event that generator 15b fails, the remaining generator 15a can be utilised to provide electrical power to all of the motors 19a-d, and therefore to all of the propellers 4a-d. Furthermore, in the event that the directly driven electrical motor 19b becomes de-synchronised with the AC electrical network 16b (such as due to a bird strike or a power transient), re-synchronisation can be achieved by transferring power from the first AC network 16a to the second network 16b.

In a third operating mode, the system is operated with the first converter 17a operated in the DC to AC conversion mode, and the second converter 17b operated in the AC to DC conversion mode. Again therefore, power is re-routed, this time from the second 16b to the first AC network 16a.

Furthermore, a degree of redundancy is provided, since, in the event of one of the converters 17a, 17b failing, power can be provided to the indirectly coupled motors 19c, 19d via the other converter.

Figure 3:
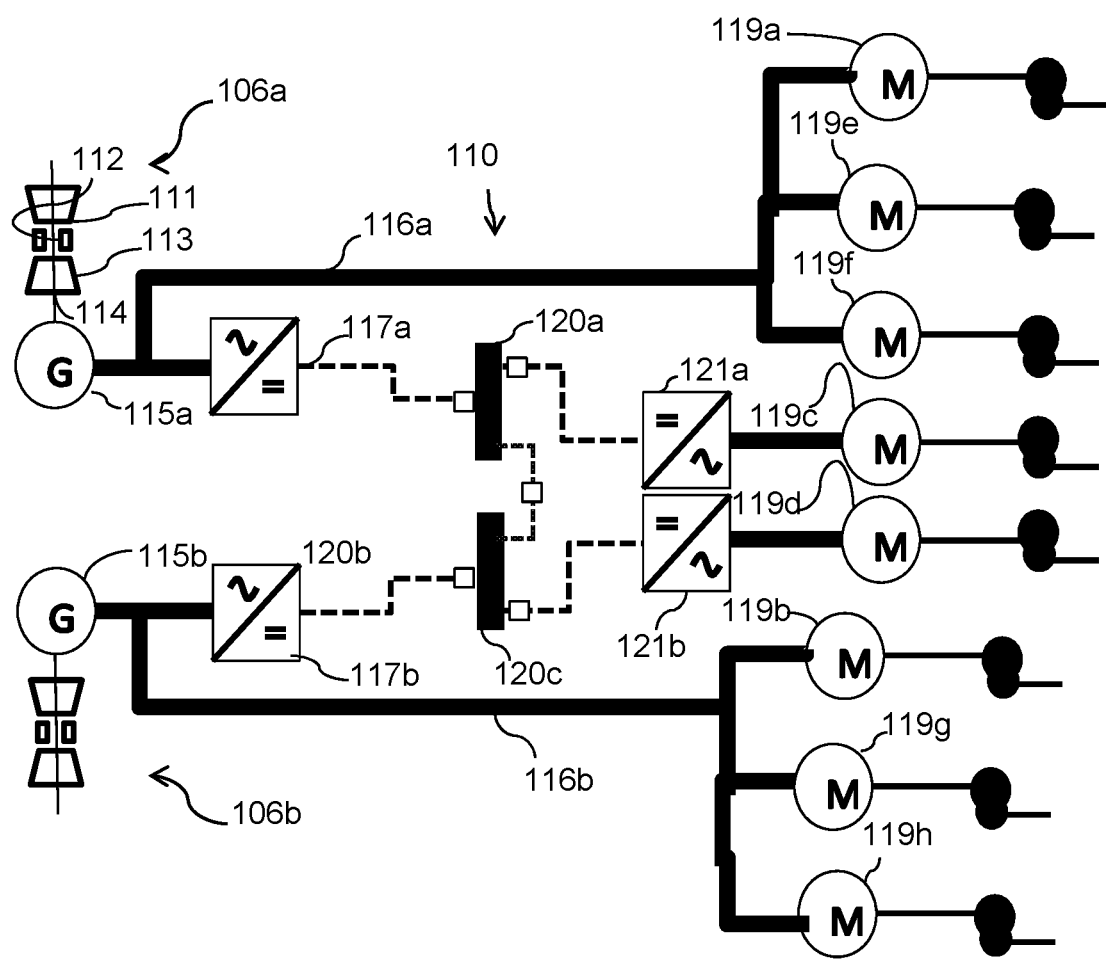
FIG. 3 is a schematic of an alternative propulsion system for the aircraft of FIG. 1.
Figure 4:
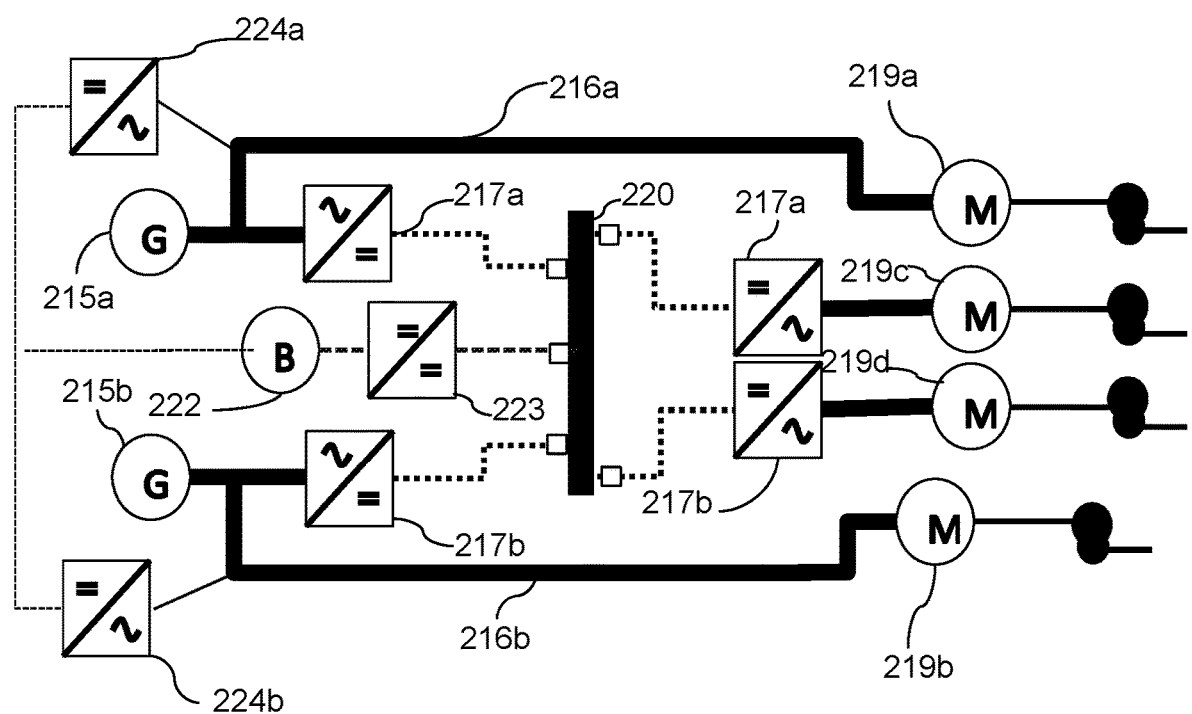
FIG. 4 is a schematic of a further alternative propulsion system for the aircraft of FIG. 1.

FIG. 3 shows a second electrical network 110 in accordance with the present disclosure, which is suitable for use in an aircraft similar to that shown in FIG. 1.

Again, the system comprises first and second AC synchronous generators 115a, 115b, which are similar to the generators 15a, 15b. In this case, each generator 115a, 115b is coupled to a respective, separate gas turbine engine 106a, 106b. Each generator 115a, 115b is coupled to a respective AC network 116a, 116b, which comprises a respective bi-directional AC/DC converter 117a, 117b, similar to the converters 17a, 17b. Again, a DC network 118 is provided, to which inverters 121a, 121b are coupled via DC buses 120a-c. Directly coupled AC synchronous motors 119a, 119b are coupled to the AC networks 116a, 116b, and indirectly coupled motors 119c, 119d are coupled to the inverters 121a, 121b.

This embodiment differs from the first embodiment in that further directly coupled motors 119e-h are provided. Consequently, a total of six directly coupled motors are provided, compared to two indirectly coupled motors. Consequently, a narrower band of thrust can be controlled using the motor controllers. However, this may be sufficient to provide short term, small throttle changes, with larger thrust changes being made by adjusting the rotational speed of the engines 106a, 106b using respective engine controllers. Such an arrangement has the advantage of providing greater efficiency at the design point, since a greater proportion of thrust is provided by directly coupled AC motors, which produce lower network losses.

FIG. 3 shows a third electrical network 110 in accordance with the present disclosure, which is suitable for use in an aircraft similar to that shown in FIG. 1.

Again, the system comprises first and second AC synchronous generators 215a, 215b, which are similar to the generators 15a, 15b coupled to respective gas turbine engines (not shown). Each generator 215a, 215b is electrically coupled to a respective AC network 216a, 216b, which comprises a respective bi-directional AC/DC converter 217a, 217b, similar to the converters 17a, 17b. Again, a DC network 218 is provided, to which inverters 221a, 221b are coupled via a single DC electrical bus 220. Directly coupled AC synchronous motors 219a, 219b, are coupled to the AC networks 216a, 216b, and indirectly coupled motors 219c, 219d are coupled to the inverters 221a, 221b. A battery 222 and DC-DC converter is also provided in electrical contact with the DC network 218.

This embodiment further differs from the previous embodiments in that the AC electrical network further comprises first and second further bi-directional AC-DC converters 224a, 224b are provided. Each of the further bi-directional AC-DC converters 224a, 224b are operable to convert AC power from a respective AC electrical network 216a, 216b to DC power for the battery 222, and are operable to convert DC power from the battery 222 to AC power for the respective AC electrical networks 216a, 216b. In this embodiment, both generators can fail, yet power can still be provided to both the directly connected motors 219a, 219b, and the indirectly connected propulsors 219c, 219d. Furthermore, power can still be transferred between the AC electrical networks 216a, 216b in the event of a failure of one of the bi-directional converters 217a, 217b.

Figure 5:
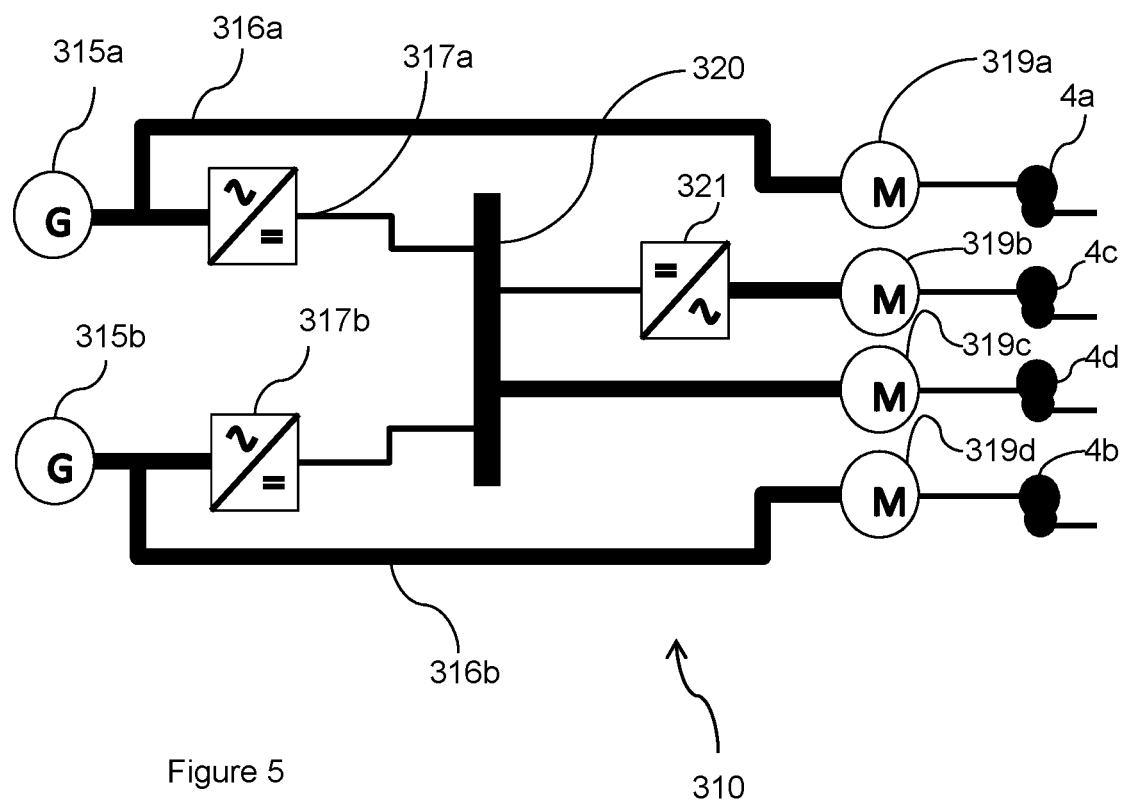
FIG. 5 is a schematic of a still further alternative propulsion system for the aircraft of FIG. 1.

FIG. 5 shows a shows a fourth electrical network 110 in accordance with the present disclosure, which is suitable for use in an aircraft similar to that shown in FIG. 1.

The system 310 comprises first and second AC generators 315a, 315b. in this embodiment, the AC generators 315a, 315b are asynchronous inductance generators, which provide AC electrical power having a frequency that is not directly proportional to their rotational speed, since there is a degree of "slip" between the rotating magnetic field and the electrical energy induced in the stator coils.

Each generator 315a, 315b is electrically coupled to a respective AC network 316a, 316b, which comprises a respective AC/DC converter 317a, 317b. Again, in this case, the converters 317a, 317b differ from those in previous embodiments, in that the converters are one way only, i.e. they are only required to convert AC electrical power from the AC electrical network 316, 316b to DC power for a DC network 318.

The DC network 318 comprises an inverter 321 which is coupled via a DC electrical bus 320. Directly coupled AC motors 319a, 319b, are coupled to the AC networks 316a, 316b, and further motors 319c, 319d are coupled to the DC network 320. Again, in this case the directly coupled first and second motors 219a, 219b differ from those of other embodiments, in that they comprise asynchronous AC motors, such as squirrel cage inductance motors, which have a rotational frequency that may differ from the AC power frequency. A first further AC motor 319b is indirectly coupled to the DC electrical 320 via the inverter 321. Again, the first further AC motor 319b may comprise a synchronous motor or an asynchronous motor. A second further motor 318c is directly coupled to the DC electrical network 320, and comprises a DC electrical motor, such as a brushed or brushless electrical motor.

In this embodiment, thrust control of the propulsors 4a-d can be provided, whilst maintaining the gas turbine engines and generators 315a, 315b at a constant speed, whilst also providing an efficient lightweight system in view of the high energy efficiency of AC generators and motors.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or generator.

Each generator may be directly coupled to the respective gas turbine engine main shaft, or may be coupled via a bevel drive. Alternatively, the generator may be indirectly coupled to the gas turbine engine, such as through torque converter or continuously variable transmission. The generators may be driven by alternative means, such as reciprocating diesel or petrol engines. The propellers could have a fixed pitch. The energy storage device could comprise a fuel cell. The propellers may be installed on different parts of the aircraft. For example, the indirectly coupled motors may be provided further from the generators than the directly coupled motors. Since DC cables generally have a lower mass than AC cables, a reduction in overall weight may be achieved. Consequently, the indirectly coupled motors may be located at the tail of the aircraft, and may be configured to ingest boundary layer air.

As a further alternative, the gas turbine engines may further comprise one or more mechanically driven fans configured to act as propulsors. Consequently, the electrically driven propulsors may only provide a part of the propulsive power of the aircraft.

Although the invention has been described in relation to an aircraft propulsion system, it will be appreciated that the invention is equally applicable to other vehicles, such as land vehicles, ships and submarines. Where the vehicle is an aircraft, the aircraft may comprise a fixed wing aircraft or a vertical takeoff aircraft such as a helicopter. The aircraft may be manned or unmanned.

Similarly, it will be understood that, where the electrical motors are synchronous electrical motors, the motors may be re-synchronised to the AC input power by an alternative method, such as one or more of:
PWM (pulse width modulation) control;
mechanical speed control of the motor or associated propeller, such as by a clutch, brake, or slave magnetic brake;
voltage or current control;
phase or phase angle control;
switchgears or electronic switching;
disconnection of the motor/generator from the converter for a given period of time;
use of the converter to vary the speed of the motor/generator to reach synchronism; and
reconnection of the motor/generator to the rest of the network once synchronism has been achieved through dropping speed, frequency, power.

The invention claimed is:

1. A vehicle propulsion system comprising:
at least first and second electrical generators, each being configured to provide electrical power to a respective first and second AC electrical network, the at least first and second electrical generators being coupled to the respective first and second AC electrical network at a first end of the respective first and second AC electrical network;
at least first and second AC electrical motors directly electrically coupled to the respective first and second AC electrical network at a second end of the respective first and second AC electrical network and coupled to a respective propulsor, the first end and the second end being different ends of the respective first and second AC electrical network, and the respective propulsor driven by the at least first and second AC electrical motors are not mechanically coupled to a gas turbine engine; and
a DC electrical network electrically coupled to the first and second AC networks via respective first and second AC to DC converters, and to a further electrical motor, the further electrical motor being coupled to a propulsor.

2. A system according to claim 1, wherein each AC electrical generator comprises a synchronous AC generator such as a permanent magnet or wound field synchronous generator.

3. A system according to claim 1, wherein each AC electrical generator comprises an asynchronous electrical generator such as an induction generator.

4. A system according to claim 1 wherein one or more AC electrical motor comprises a synchronous AC motor such as a permanent magnet or wound field synchronous motor.

5. A system according to claim 1, wherein one or more AC electrical motor comprises an asynchronous electrical motor such as an induction motor.

6. A system according to claim 1, wherein the first and/or second AC to DC converters comprise bi-directional AC to DC converters configured to provide AC electrical power from the AC network to DC electrical power to the DC network, and DC electrical power from the DC network to AC electrical power to the AC electrical network.

7. A system according to claim 1, wherein the further electrical motor comprises one of an DC electrical motor directly electrically coupled to the DC electrical network, and an AC electrical motor coupled to the DC electrical network via a DC to AC inverter.

8. A system according to claim 6, wherein the system comprises a controller configured to control the first and second bi-directional AC-DC converters between:

a first operating mode, in which both the first and second AC-DC converters convert AC power from the respective AC networks to DC power to power to the DC network;
a second operating mode, in which the first AC-DC converter converts AC power from the first AC network to DC power to power the DC network, and the second AC-DC converter converts DC power from the DC network to AC power to power the second AC electrical network; and
a third operating mode, in which the second AC-DC converter converts AC power from the second AC network to DC power to power the DC network, and the first AC-DC converter converts DC power from the DC network to AC power to power the first AC electrical network.

9. A system according to claim 8, wherein controller may be configured to switch from the first operating mode to the second or third operating mode in the event of one or more of:
the synchronous electrical motor directly coupled to the first or second electrical network becoming de-synchronised from the respective AC network; and
a failure of the first or second electrical generator.

10. A system according to claim 1 wherein the first and second generators are driven by the gas turbine engine.

11. A system according to claim 1, wherein the system comprises an energy storage device such as one or more of a battery, a capacitor and a hydrogen fuel cell electrically coupled to the DC electrical network, the energy storage device being configured to provide electrical power to the DC network in a discharging mode, and to receive electrical power from the DC network in a charging mode.

12. A system according to claim 11, wherein the system comprises a further bi-directional AC-DC converter electrically coupled to at least one of the first and second AC networks and the energy storage device, and configured to provide electrical power from the energy storage device to the or each AC network in a discharging mode, and to receive electrical power from the DC network in a charging mode.

13. A vehicle comprising the propulsion system of claim 1.

14. A vehicle according to claim 13, wherein the vehicle comprises an aircraft.

15. A system according to claim 1, wherein the first electrical generator is spaced from the first AC electrical motor, and the second electrical generator is spaced from the second AC electrical motor.

* * * * *